United States Patent Office 3,300,294
Patented Jan. 24, 1967

3,300,294
SLOW RELEASE FERTILIZER COMPOSITION COMPRISING DISPERSION OF UREA-WAX ADDUCT IN WAX-POLYMER BLEND
Elmer J. Hollstein, Wilmington, Del., assignor to Sun Oil Company, Philadelphia, Pa., a corporation of New Jersey
No Drawing. Filed May 27, 1964, Ser. No. 370,693
7 Claims. (Cl. 71—28)

This invention relates to slow release fertilizer compositions which comprise a dispersion of a urea-paraffin wax adduct in a blend of wax and a particular type of polymer. The use of a blend of wax and polymer as the dispersant rather than a wax alone results in an improvement in the water resistance of the composition.

The need for slow release fertilizers is well known. A slow release fertilizer is resistant to leaching by water and releases nutrients to the soil at a predetermined rate irrespective for the most part of soil and climatic conditions. Various slow release fertilizer compositions are known. One such composition is a dispersion of solid fertilizer in solid wax and can be formed, for example, by dispersing the solid fertilizer in molten wax, forming the dispersion into small discrete particles by means of, say, a pellet mold, and cooling the particles to a temperature below the melting point of the wax. The resulting particles are a dispersion of solid fertilizer particles in solid wax. Each fertilizer particle is substantially completely surrounded by and encased in solid wax. The water resistance of the fertilizer particles can be increased or decreased by increasing or decreasing the amount of wax employed. Where it is desired that the fertilizer contain a source of nitrogen, urea is preferred because it contains a higher percentage of nitrogen than other conventional solid nitrogen fertilizers.

In a copending application Serial No. 308,087, filed September 11, 1963, by Messrs. A. J. Bozzelli, S. G. Balak, and R. H. Campbell, novel slow release fertilizer compositions are disclosed and claimed. The compositions comprise a dispersion of a urea-paraffin wax adduct in petroleum wax, the latter being defined as paraffin wax or microcrystalline wax. As disclosed therein a dispersion of a urea-paraffin wax adduct in petroleum wax has a higher resistance than a dispersion of urea in petroleum wax containing the same total amounts of urea and wax but in which the urea is in the unadducted form. For example, a dispersion of 60 parts urea in 40 parts paraffin wax has a lower water resistance than a dispersion of 79 parts of a urea-paraffin wax adduct, the adduct containing 60 parts urea and 19 parts paraffin wax, dispersed in 21 parts paraffin wax. All percentages, proportions, parts, and amounts herein are by weight.

It has now been found that the water resistance of a slow release fertilizer comprising a dispersion of a urea-paraffin wax adduct in petroleum wax can be improved by incorporating in the petroleum wax either a relatively large amount or a relatively small amount of a polymer selected from the group consisting of atactic polypropylene, polybutene, and polyisobutylene. The compositions of the present invention therefore comprise a dispersion of a urea-paraffin wax adduct in a blend of (1) petroleum wax and (2) atactic polypropylene, polybutene, or polyisobutylene. Substantially all the particles of the urea-paraffin wax adduct are surrounded by and encased in a blend of petroleum wax and a polymer of the type described. For the present purpose the term petroleum wax includes only paraffin wax and microcrystalline wax, these two waxes being distinguished from each other and from other waxes hereinafter.

The compositions of the invention can be formed by any of several methods. Describing suitable methods it will be assumed that the wax component of the wax-polymer blend in which it is desired to disperse the adduct is paraffin wax. One method involves preforming the adduct and then dispersing the adduct in a blend of paraffin wax and the polymer. For example, a methanol solution of urea is mixed with a benzene solution of paraffin wax. Upon such mixing the urea and paraffin wax react to form an adduct which immediately precipitates and is then separated by, say, filtration. Next the wax-polymer blend in which the adduct is to be dispersed is prepared by heating the wax to above its melting point, adding the polymer to the molten wax, and stirring the resulting mixture until a substantially homogeneous blend of wax and polymer is obtained. The adduct particles are then added to the molten wax-polymer blend and the resulting mixture is stirred or otherwise mixed until the adduct particles are uniformly dispersed in the blend. The resulting dispersion is then shaped into fertilizer size particles by means of, say, a pellet mold after which the particles are allowed to cool below the melting point of the blend and they are then removed from the mold. The resulting particles are a dispersion of a urea-paraffin wax adduct in a wax-polymer blend.

A disadvantage of the above method of preparing the compositions of the invention is that the adduct particles formed in the manner described have an extremely small size. These small size adduct particles not only create a dust hazard but they are also somewhat difficult to uniformly disperse in the molten wax-polymer blend, this latter difficulty being especially true when it is desired to disperse a major amount of adduct in a minor amount of the blend. For these reasons, the preferred method of forming the compositions of the invention involves forming the adduct in situ in the molten wax-polymer blend. By way of example, the total amount of wax, i.e., the wax required to adduct with the amount of urea to be used plus the amount of wax in which as a blend with the polymer it is desired to disperse the adduct, is heated to above its melting point. The polymer is then added to the wax and the mixture is stirred until a homogeneous wax-polymer blend is obtained. The urea, preferably commercial crystal urea which has a particle size mainly larger than 100 mesh, is then added to the molten wax-polymer blend and the mixture is stirred until the urea is reasonably well dispersed in the blend. In this gross dispersion the urea will not react with the paraffin wax because the polymers suitable for the present purpose act as adduct inhibitors, i.e., they prevent urea and molten paraffin wax from reacting to form an adduct. However, adduction can be forced, i.e., made to occur, by any of several methods. One method is to add a small amount of acetone, methanol, water, or other adduct accelerator to the gross dispersion. This effects adduction of the urea almost instantaneously but has a disadvantage in that if the gross dispersion contains more than about 50% urea the entire dispersion is converted to a solid having about the texture of wet sand and which because of its lack of fluidity is difficult to handle in conventional tanks, pumps, etc. The lack of fluidity is due to the adsorption of the wax-polymer blend on the surface of the adduct particles. A preferred method of causing the urea in the gross dispersion to adduct with some of the wax in the blend is to pass the gross dispersion through a roller mill having a roller clearance sufficiently small to subdivide the urea to smaller than about 200 mesh, preferably to smaller than 400 mesh. The mechanical work of the milling operation will cause the urea in the gross dispersion to adduct with some of the wax in the blend even though the wax contains a polymer which is normally effective to inhibit adduction. The material discharged from the roller mill is a damp almost powdery solid having about the texture of wet sand. It can be used as is as a slow release fertilizer but its particle size is smaller than the 6 to 40 mesh normally desired for a fertilizer. A size of 6 to 40 mesh means that all the particles pass a 6 mesh screen and all the particles are retained on a 40 mesh screen. All mesh sizes herein are by U.S. Sieve sizes. Consequently, the material discharged from the roller mill is preferably then formed into 6–40 mesh, preferably 8–30 mesh, particles. This forming can be effected by extruding the roller mill discharge at about 125°–175° F., but can also be effected by other means, for example, by compressing the roller mill discharge in a mold at 125°–175° F. and under high, e.g., 50000–10,000 p.s.i.g. pressure.

Another reason why it is preferable to form the roller mill discharge into 6–40 mesh particles rather than using the roller mill discharge as is as a slow release fertilizer is that the water resistance of the urea in the 6–40 mesh particles is usually higher than that of the urea in the roller mill discharge.

In the above description of some suitable methods of making the compositions of the invention certain techniques have been described as preferred. Certain other aspects of these methods should also be noted. As between (1) preforming the adduct and then dispersing the adduct in the wax-polymer blend and (2) forming the adduct in situ in the wax-polymer blend, the former is preferred because the ultimate fertilizer particles produced normally have a higher water resistance than particles made by the latter method. On the other hand, the in situ adduct formation technique is preferred because it usually can be carried out more conveniently. In describing the formation of the adduct in situ in the wax-polymer blend it was mentioned that the urea in the gross dispersion of urea in wax-polymer blend could be caused to adduct by adding an adduct accelerator such as acetone to the gross dispersion but is preferably effected by roller milling the gross dispersion. Another reason why the roller milling technique is preferred to the use of acetone, etc. is that fertilizer particles ultimately obtained usually have a higher water resistance than when the adduct accelerator technique is used.

As described, the polymers suitable for the present purpose are atactic polypropylene, polybutene, and polyisobutylene. Atactic polypropylene is the preferred polymer. The preparation of these polymers is well known. For example, atactic polypropylene can be prepared by subjecting propylene, in an inert solvent such as pentane, hexane, etc. to the action of a metal halide-metal alkyl complex catalyst, the preferred catalyst being a titanium trichloride-aluminum triethyl complex. The reaction temperature is maintained at about 140° F. to 180 F. and the pressure at about 100–250 p.s.i.g. The amount of $TiCl_2$ used is usually 0.05–5.0% by weight of solvent and the molar ratio of aluminum to titanium is preferably 0.5:1 to 1.0:1. The amount of solvent employed is usually such that the amount of solvent soluble polypropylene produced is 10–30% by weight of solvent. After a reaction time of 30 minutes to 2 hours the reaction is killed by adding a small amount of methanol. The polymer product consists of both isotactic and atactic polypropylene. The isotactic polymer is insoluble in the solvent and is separated by filtration, etc. The atactic polymer is soluble in the solvent and is recovered therefrom by stripping off the solvent. To insure a high purity atactic polymer it is usually desirable to redissolve it in an additional quantity of solvent, separate any insoluble matter, and again strip off the solvent. The molecular weight of the recovered atactic polypropylene will be in the range of 4000 to 100,000 as determined by intrinsic viscosity in tetralin at 135° C. and can be varied by varying reaction time. All polymer molecular weights herein are by this method. For the present purpose the atactic polypropylene should have a molecular weight of at least 4000, preferably at least 8000. The molecular weight can be as high as desired so long as the polymer is still soluble in, i.e., will still blend with molten wax to form a substantially homogeneous mixture. As is well known, as the molecular weight of the polymer increases, its solubility in wax tends to decrease. In most cases the molecular weight of the atactic polypropylene will not exceed 50,000. Preferably the molecular weight is in the range of 4000 to 30,000.

The term atactic polypropylene also includes atactic copolymers of propylene and ethylene in which the amount of ethylene is small, i.e., less than 5%. Such copolymers are described in detail in Union of South Africa Patent 69,839, issued to Hercules Powder Co. Above 5% ethylene the copolymer is unsuitable for the present purpose probably because the properties of the coplymer are more like polyethylene than atactic polypropylene. Polyethylene is unsuitable for the present purpose. A statement that a polymer is unsuitable means, unless otherwise stated, that the incorporation of the polymer in the wax phase of a dispersion of a urea-paraffin wax adduct in wax does not improve the water resistance of the composition.

Polybutenes and polyisobutylene can also be prepared by well known techniques. See, for example, Schlidknect, Vinyl and Related Polymers, John Wiley and Sons, New York (1952), pp. 534 et seq., and Kirk-Othmer, Encylopedia of Chemical Technology, Interscience Encyclopedia, Inc., New York, 1953, vol. 11, pp. 1–4. For the present purpose the polybutene or polyisobutylene should have a molecular weight of at least 4000, preferably at least 8000. As mentioned above for atactic polypropylene, the molecular weight of the polybutene or polyisobutylene can be as high as desired so long as the polymer is soluble in the wax. For the present purpose the molecular weight will normally not exceed 50,000. Preferably it does not exceed 30,000. In describing polybutenes and polyisobutylene it is not necessary to refer to them as atactic or isotactic since they have never been prepared except as atactic polymers.

The amount of each ingredient in the compositions of the invention can vary considerably. Any amount of adduct can be dispersed in any amount of the wax-polymer blend because any amount of the latter will improve the water resistance of the former. The ratio of adduct to wax-polymer blend will be dictated in most cases by soil and climatic conditions. As this ratio increases the fertilizer water resistance decreases. Consequently, in areas of heavy rainfall the ratio of adduct to wax-polymer blend will usually be relatively low while in relatively dry areas this ratio will normally be relativey high. In most cases, however, the amount of adduct will be within certain ranges depending upon the type of slow release fertilizer being prepared. If the fertilizer is to contain only a source of nitrogen, the adduct will be such source and the amount of adduct will normally be a major amount, i.e., over 50%, and the amount of the wax-polymer blend will normally be a minor amount, i.e., less than 50%, the percentages being based on the total composition, i.e., adduct plus wax blend. In most cases the composition will contain 50–98% adduct, more frequently 60–95%, and 2–50% wax-polymer blend, more frequently 5–40%.

It will be desirable in many cases to prepare a complete fertilizer, i.e., a fertilizer containing not only a source of nitrogen but also a source of potassium and phosphorus. In this case the fertilizer will contain not only a urea-paraffin wax adduct as the source of nitrogen but will also contain other conventional fertilizer compounds such as potassium chloride, mono- or diammonium phosphate, potassium nitrate, phosphate, or sulfate, superphosphate, and triple superphosphate. In the case of a complete fertilizer the total amount of fertilizer ingredients in the composition will still normally be a major amount, usually 50–98%, more frequently 60–95%, but the amount of adduct may be relatively small. For example, a 5–15–10 slow release complete fertilizer, i.e., a fertilizer containing 5% nitrogen as N, 15% phosphorus as $P_2O_5$, and 10% potassium as $K_2O$ might contain the following:

| | Percent |
|---|---|
| Urea-paraffin wax adduct | 14.1 |
| Triple superphosphate | 32.6 |
| Potassium sulfate | 18.5 |
| | 65.2 |
| Wax-polymer blend | 34.8 |
| | 100.0 |

Normally the amount of adduct in a fertilizer containing a plurality of essential elements will not be less than 10% by weight of the total composition. Usually it will be at least 20%. Therefore, considering both the case of a nitrogen fertilizer and the case of the fertilizer containing a plurality of essential elements, the amount of adduct will usually be 10–98 parts, more frequently 20–95 parts, and the amount of wax-polymer blend will usually be 2–50 parts, more frequently 5–40 parts.

A slow release fertilizer containing a urea-paraffin wax adduct plus other fertilizer ingredients can be prepared in essentially the same manner described hereinbefore. For example, rather than dispersing a preformed adduct in a wax-polymer blend, a mixture of preformed adduct and the other fertilizer ingredients is dispersed in the blend. Alternatively, a mixture of urea and the other fertilizer ingredients is dispersed in the wax-polymer blend after which the dispersion is passed through a roller mill in order to cause the urea to adduct.

The amount of wax and polymer in the wax-polymer blend can also vary considerably. The amount of polymer can, as shown more clearly in the subsequent examples, be either a major amount or a minor amount, the balance of the blend being wax, the amounts being based on the total weight of the blend. Preferably the amount of polymer is 5–95%, more preferably 10–90%.

The terms paraffin wax and microcrystalline wax are used herein in accordance with their conventional meanings. Both types of waxes are obtained only from petroleum. Moreover, they are the only types of wax obtainable from petroleum, hence they are referred to generically as petroleum wax. Their differences and similarities are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branch chain paraffins. Some typical properties of paraffin and microcrystalline waxes are as follows:

| Property | Paraffin Wax | Microcrystalline Wax |
|---|---|---|
| Molecular Weight | 250–500 | 500–800. |
| Melting Point [1] | 110–165° F | 140°–210° F. |
| Viscosity at 210° F.[2] | 30–50 S.U.S. | 60–100 S.U.S. |
| Penetration at 77° F.[3] | 5–25 dmm | 5–25 dmm. |

[1] ASTM D-127.
[2] ASTM D-446.
[3] ASTM D-1321, 100 g., 5 sec.

It is apparent from the data shown above that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous.

The wax used to form the adduct will of course be a paraffin wax since microcrystalline wax does not react with urea to form an adduct. To form the adduct any kind of paraffin wax, e.g., high melt point, low melt point, hard, soft, etc., can be used since any kind of paraffin wax reacts with urea to form an adduct, the composition of the adduct being 76% urea-24% paraffin wax regardless of the paraffin wax used. The wax component of the wax-polymer blend can be either paraffin or microcrystalline wax but it is preferably also paraffin wax.

The following examples illustrate the invention more specifically.

Example 1

Into a mixing vessel equipped with heating means is charged 35 parts of a paraffin wax having a melting point of 129° F., a penetration of 18 dmm. at 77° F., and a viscosity of 38 S.U.S. at 210° F. The wax is heated until molten after which 65 parts of commercial crystal urea are added thereto with stirring. The urea is reasonably well dispersed in the wax and the resulting gross dispersion is then charged to a roller mill having 3 rollers turning in such a manner that the feed thereto passes downwardly between the first and second rollers and then upwardly between the second and third rollers. The roller clearance is such that any material discharged from the roller has a particle size of smaller than 200 mesh. The discharge from the roller mill is a damp, powdery solid. The formation of the gross dispersion of urea in wax and the charging thereof to the roller mill is performed very rapidly lest the urea and wax react to form an adduct in the mixing vessel. The roller mill discharge is then charged to a mold maintained at 150° F. and is compressed under a pressure of 6000 p.s.i.g. into a rectangular block having a size of 4″ x 4″ x ¼″. This particle is then charged to a Waring Blendor and is broken up into a plurality of small particles. The small particles are screened and the 10–20 mesh fraction, which constitutes 90% of the entire quantity of small particles, is separated. A ten gram quantity of this 10–20 mesh fraction is then placed in a water permeable paper bag similar to a tea bag and the bag is submerged in water at 78° F. without agitation. At periodic intervals after submergence the water is removed, replaced with fresh water, and the withdrawn water is analyzed for urea. Knowing the amount of urea in the original sample (6.5 gms.) and the amount of urea in each portion of withdrawn water, the amount of urea leached out of the fertilizer can be calculated. The rate at which urea is leached out is a measure of the water resistance of the fertilizer. The data in Table I below show the amount of urea leached out at varying time intervals.

TABLE I

| Composition | | | | Percent Urea Leached Out After Stated Hours Under Water | | | |
|---|---|---|---|---|---|---|---|
| Urea | Total Wax | Adduct | Wax | 0 | 50 | 200 | 400 |
| 65 | 35 | 85.6 | 14.4 | 0 | 60 | 100 | |

Examples II–III

These two examples are the same as Example I except that in each case a blend of paraffin wax (of the same type used in Ex. I) and atactic polypropylene is used instead of paraffin wax alone. In Example II the blend is 30 parts paraffin wax and 5 parts atactic polypropylene while in Example III the blend is 5 parts paraffin wax and 10 parts atactic polypropylene. In each case the atactic polypropylene has a molecular weight of 20,000. Also in each case, the blend is perpared by adding the atactic polypropylene to the molten wax and stirring until the polymer dissolves in the wax to form a homogeneous blend. The urea is then added to the blend after which the procedure is the same as in Example I.

The data in Table II show the water resistance of these two compositions. The data from Table I is also included for ready comparison. Atactic polypropylene is abbreviated APP in Table II and in all subsequent tables.

as that prepared in Example IV except that isotactic polypropylene of 20,000 molecular weight is used instead of the atactic polypropylene, and the last of which is the composition prepared in Example V.

TABLE II

| Composition | | | | | | Percent Urea Leached Out After Stated Hours Under Water | | | |
|---|---|---|---|---|---|---|---|---|---|
| Urea | Total Wax | APP | Adduct | Wax-APP Blend | APP as percent of Wax-APP Blend | 0 | 50 | 200 | 400 |
| 65 | 35 | -------- | 85.6 | 14.4 | 0 | 0 | 60 | 100 | -------- |
| 65 | 30 | 5 | 85.6 | 14.4 | 34.7 | 0 | 48 | 77 | 80 |
| 65 | 25 | 10 | 85.6 | 14.4 | 69.5 | 0 | 30 | 56 | 61 |

It can be seen from the data in Table II that the use of a blend of wax and atactic polypropylene results in fertilizer water resistance which is higher than that obtained when the adduct is dispersed in wax alone.

*Example IV*

This example is the same as Example II except that the amount of urea is 60 parts and the amount of wax is 35 parts. Thus the composition contains 79 parts of adduct dispersed in 21 parts of a wax-atactic polypropylene blend. The blend contains 16 parts wax and 5 parts atactic polypropylene, hence the atactic polypropylene is 23.8% of the blend. The results of the water resistance test are shown in Table III below along with the results of Example V.

*Example V*

This example is for comparison purposes and is the same as Example I except that the amounts of urea and wax are 60 parts and 40 parts respectively rather than 65 parts and 35 parts respectively. The data in Table III below show the water resistance of the compositions of Examples IV and V.

TABLE IV

| Composition | | | Percent Urea Leached Out After Stated Hours Under Water | | | |
|---|---|---|---|---|---|---|
| Urea | Wax | Polypropylene | 0 | 50 | 200 | 400 |
| 60 | 40 | -------- | 0 | 52 | 90 | 100 |
| 60 | 35 | 5 Atactic | 0 | 50 | 64 | 70 |
| 60 | 35 | 5 Isotactic | 0 | 81 | 98 | 100 |

Two conclusions can be drawn from the data in Table IV. One is that the composition containing isotactic polypropylene is inferior from a water resistance to the corresponding composition containing atactic polypropylene. Secondly, not only is the isotactic composition inferior to the atactic composition but it is also inferior to a composition which contains no polypropylene. Thus if the control is a composition containing no polymer, addition thereto of atactic polypropylene results in an improvement while addition thereto of isotactic polypropylene degrades the composition. This is unexpected

TABLE III

| Composition | | | | | | Percent Urea Leached Out After Stated Hours Under Water | | | |
|---|---|---|---|---|---|---|---|---|---|
| Urea | Total Wax | APP | Adduct | Wax-APP Blend | APP as percent of Wax-APP Blend | 0 | 50 | 200 | 400 |
| 60 | 40 | -------- | 79 | 21 | 0 | 0 | 52 | 90 | 100 |
| 60 | 35 | 5 | 79 | 21 | 23.8 | 0 | 50 | 64 | 70 |

From the data contained in Tables II and III it is apparent that a distinct improvement in the water resistance of the adduct has been achieved by dispersing the adduct in a wax-polymer blend rather than in wax alone. This result is surprising when it is realized that only the polymers specified herein yield this beneficial improvement. When other polymers are added to the wax in which the adduct is dispersed instead of the polymers specified the adduct water resistance is decreased rather than increased. This is shown more clearly by the data in Table IV which shows the water resistance of three compositions, one of which is the composition prepared in Example IV, another of which is the same when one considers how closely related atactic and isotactic polypropylene are.

The benefits obtained by the use of the polymers specified is surprising from another standpoint. If atactic polypropylene is incorporated into the wax phase of a dispersion of urea in wax in which the urea is not adducted, the water resistance of the composition is decreased and not increased as is the case when the urea is adducted. The data in Table V show the water resistance of two compositions. In preparing one of them 60 parts crystal urea is dispersed in 40 parts molten wax, the dispersion is rapidly formed into cylindrical particles and cooled below the melting point of the wax before adduction occurs. The other is prepared in the same manner except that instead of using 40 parts wax a blend of 28 parts wax and 12 parts atactic polypropylene is used. The water resistance of the two compositions is shown in Table V below.

TABLE V

| Composition | | | | Percent Urea Leached Out After 3 Hours Under Water |
|---|---|---|---|---|
| Urea (Unadducted) | Wax | APP | APP as Percent of Wax-APP Blend | |
| 60 | 40 | ----- | ------------ | 15 |
| 60 | 28 | 12 | 30 | 25 |

It can be seen that the inclusion of the atactic polypropylene in the composition has reduced the water resistance thereof.

Substantially the same results as obtained in the above examples are obtained when other polymers of the type specified herein are used instead of atactic polypropylene.

The invention claimed is:

1. A particulate slow release fertilizer composition comprising a dispersion of a urea-paraffin wax adduct in a homogeneous blend of petroleum wax and a wax-soluble polymer having a molecular weight of at least 4000 and which is selected from the group consisting of atactic polypropylene, polybutene, and polyisobutylene, the amount of both said blend and said polymer being sufficient to improve the water reisistance of the composition.

2. Composition according to claim 1 wherein said petroleum wax is paraffin wax.

3. Composition according to claim 1 wherein the amount of polymer in said blend is 5-95% based on said blend.

4. Composition according to claim 1 wherein the amount of said adduct is 10-98 parts, the amount of said blend is 2-50 parts, the amount of polymer in said blend is 5-95% based on said blend, said petroleum wax is paraffin wax and said polymer is atactic polypropylene.

5. Composition according to claim 1 wherein the amount of said adduct is 10-98 parts and the amount of said blend is 2-50 parts.

6. Composition according to claim 1 wherein said polymer is atactic polypropylene.

7. Composition according to claim 6 wherein said petroleum wax is paraffin wax.

References Cited by the Examiner

UNITED STATES PATENTS

| | | | |
|---|---|---|---|
| 2,727,025 | 12/1955 | Weitkamp | 260—96.5 |
| 2,936,226 | 5/1960 | Kaufman | 71—64 |
| 3,014,783 | 12/1961 | Young | 71—64 |
| 3,232,740 | 2/1966 | Sor et al. | 71—64 |

DONALL H. SLYVESTER, *Primary Examiner.*

S. LEON BASHORE, *Examiner.*

T. KILEY, *Assistant Examiner.*